United States Patent
Morowsky et al.

(10) Patent No.: US 10,308,372 B2
(45) Date of Patent: Jun. 4, 2019

(54) FLIGHT DECK TIMER MANAGEMENT SYSTEMS AND METHODS

(71) Applicant: HONEYWELL INTERNATIONAL INC., Morris Plains, NJ (US)

(72) Inventors: Katarina Alexis Morowsky, Corvallis, OR (US); Ivan Sandy Wyatt, Scottsdale, AZ (US); Aaron Gannon, Anthem, AZ (US)

(73) Assignee: HONEYWELL INTERNATIONAL INC., Morris Plains, NJ (US)

(*) Notice: Subject to any disclaimer, the term of this patent is extended or adjusted under 35 U.S.C. 154(b) by 80 days.

(21) Appl. No.: 15/651,413

(22) Filed: Jul. 17, 2017

(65) Prior Publication Data

US 2019/0016472 A1    Jan. 17, 2019

(51) Int. Cl.
*B64D 45/00* (2006.01)
*G01C 23/00* (2006.01)
*G08G 5/00* (2006.01)

(52) U.S. Cl.
CPC ............. *B64D 45/00* (2013.01); *G01C 23/00* (2013.01); *G08G 5/0065* (2013.01)

(58) Field of Classification Search
CPC .......... B64C 3/56; B64C 3/546; B64D 45/00; B64D 45/0005; B64D 2045/0085; G01C 23/00; G08G 5/0065; G05D 1/104; G05D 1/107; F41G 7/006
See application file for complete search history.

(56) References Cited

U.S. PATENT DOCUMENTS

| | | | | |
|---|---|---|---|---|
| 5,111,400 A | * | 5/1992 | Yoder | G01S 7/22 342/29 |
| 6,633,801 B1 | * | 10/2003 | Durlacher | G08G 5/0021 340/973 |
| 7,187,303 B2 | | 3/2007 | Boyns et al. | |
| 8,019,529 B1 | * | 9/2011 | Sharma | G08G 5/06 701/117 |
| 9,383,757 B2 | * | 7/2016 | Yamasaki | G05D 1/107 |

(Continued)

FOREIGN PATENT DOCUMENTS

WO     0209490 A1     2/2002

OTHER PUBLICATIONS

ASA Flight Timer Instruction Manual; Aviation Supplies & Academics Inc. Website.

*Primary Examiner* — An T Nguyen
(74) *Attorney, Agent, or Firm* — Lorenz & Kopf, LLP (57) ABSTRACT

A flight deck timer management system includes a database storing conditions representing a first monitoring mode defining at least a first rule, a first timing characteristic defining a first time period for compliance with the first rule, and a first advisory value relative to the first time period at which a first advisory is initiated. A control unit is configured to identify input states based on the input data, and to evaluate the input states in view of the first monitoring mode conditions. When the input states trigger the first monitoring mode, the control unit evaluates the input states in view of the first rule, initiates a first timer based on the first timing characteristic, monitors a first timing status of the first timer relative to the first advisory value, and generates display commands representing the first advisory when the first timer status reaches the first advisory value.

19 Claims, 6 Drawing Sheets

(56) References Cited

U.S. PATENT DOCUMENTS

| | | | |
|---|---|---|---|
| 2013/0173090 A1* | 7/2013 | Rieunier | G08G 5/0039 |
| | | | 701/3 |
| 2017/0291715 A1* | 10/2017 | Jayathirtha | B64D 45/00 |
| 2018/0155052 A1* | 6/2018 | Lacroix | G08G 5/0013 |
| 2018/0170516 A1* | 6/2018 | Niemiec | B64C 3/546 |
| 2018/0170518 A1* | 6/2018 | Niemiec | B64C 3/56 |

* cited by examiner

| TIMER | TIMER STATUS |
|---|---|
| MAX. TAKEOFF TIME REMAINING    *610* | 3 MINUTES 16 SECONDS    *620* |
| BATTERY CYCLE - START COUNT: 2<br>[REST PERIOD REM.] | 25 MINUTES 15 SECONDS<br>[40 SECONDS] |
| TIME REMAINING IN FLAP CYCLE -<br>FLAP COUNT: 2 | 40 MINUTES 37 SECONDS |

FLIGHT DECK TIMER MANAGEMENT SYSTEMS AND METHODS

TECHNICAL FIELD

The present invention generally relates to aircraft systems and methods, and more particularly relates to systems and methods for managing timing requirements on an aircraft.

BACKGROUND

Flying requires a pilot to perform multiple tasks while continuously evaluating incoming information and changing situations. Many of the operational and flight rules required for flight include timing characteristics that require the attention of the pilot. Further, in conventional flight deck systems, information and interaction regarding these requirements may be fragmented across numerous displays and typically involve mental recall regarding limitations, timer values, and timer statuses.

Accordingly, it is desirable to provide improved flight deck systems and methods for aircraft users. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a flight deck timer management system includes a database storing conditions representing a first monitoring mode defining at least a first rule, a first timing characteristic defining a first time period for compliance with the first rule, and a first advisory value relative to the first time period at which a first advisory is initiated. The flight deck timer management system further includes a control unit coupled to the database and configured to receive input data, to identify input states based on the input data, and to evaluate the input states in view of the first monitoring mode conditions. When the input states trigger the first monitoring mode, the control unit is configured to evaluate the input states in view of the first rule, initiate a first timer based on the first timing characteristic, monitor a first timing status of the first timer relative to the first advisory value, and generate display commands representing the first advisory when the first timer status reaches the first advisory value. The flight deck timer management system a display device coupled to the control unit and configured to display the first advisory based on the display commands.

In accordance with another exemplary embodiment, a method is provided for managing timers on a flight deck. The method includes storing, with a database, conditions representing a first monitoring mode defining at least a first rule, a first timing characteristic defining a first time period for compliance with the first rule, and a first advisory value relative to the first time period at which a first advisory is initiated; receiving, with a control unit, input data; identifying, with the control unit, input states based on the input data; evaluating, with the control unit, the input states in view of the first monitoring mode conditions; evaluating, with the control unit when the input states trigger the first monitoring mode, the input states in view of the first rule, initiating a first timer based on the first timing characteristic, monitoring a first timing status of the first timer relative to the first advisory value, and generating display commands representing the first advisory when the first timer status reaches the first advisory value; and displaying, with a display device, the first advisory based on the display commands.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein relate to flight deck timer management systems and methods for monitoring and displaying information associated with operational timing characteristics or requirements for one or more pilot or flight crew users. As used herein, the term "input states" refers to the collection of input data from user inputs, various systems of the aircraft, other aircraft, and/or control center that may trigger a monitoring requirement. A "monitoring mode" refers to a condition in which the input states are monitored in accordance with one or more rules for the occurrence of an event and/or a non-occurrence of an event. A "rule" may refer to one or more requirements associated with each monitoring mode, and such rules may include one or more "timing characteristics" representing a particular time period for compliance with the rule. In some instances, a mode may have more than one rule such that one or more of the rules for a mode may be selected for monitoring and evaluation based on the input states. Each timing characteristic may be in the form of one or more timers or time periods for compliance with the respective rule, each with a "timer status" representing the time elapsed since initiation or the time remaining for compliance. The rules may also define a "timer advisory" to be generated based on the timer status and displayed to the user at one or more predetermined timer statuses, monitoring modes, and/or input states. For example, a timer advisory may be associated with an advisory value relative to the timing characteristic for generation of the advisory. The timer advisory may be merely informational with the timer status and/or function as a warning with more urgent context symbology.

Figure 1:
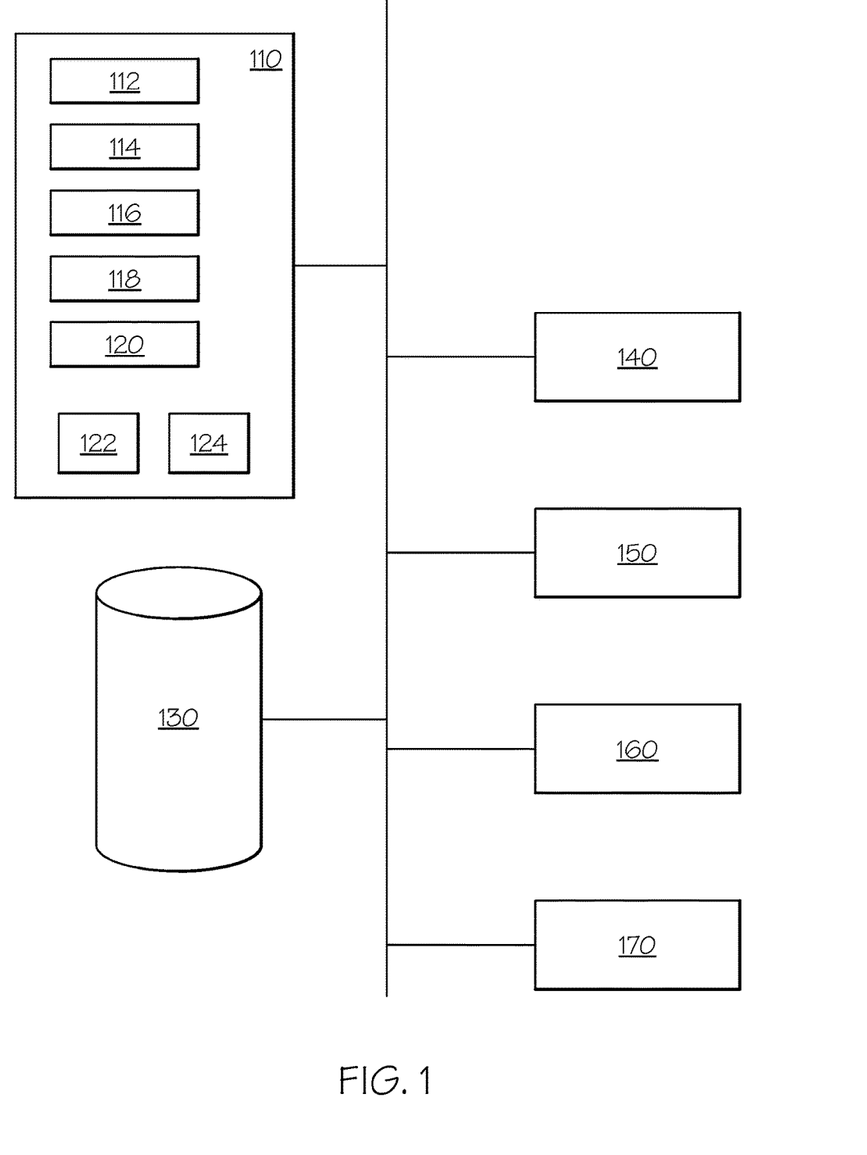
FIG. 1 is a block diagram of a flight deck timer management system in accordance with an exemplary embodiment.

FIG. 1 depicts a block diagram of an exemplary timer management system 100 that may be incorporated into the flight deck of an aircraft. In one embodiment, the system 100 may reside entirely on the aircraft, while in other embodiments, one or more aspects of the system 100 may be located off-board, such as within a control center. The systems and methods described herein may be utilized in, or with respect to, any type of aircraft, including a helicopter, airplane, or unmanned vehicle.

In the exemplary embodiment shown, the timer management system 100 includes a control unit 110, a database 130, a display device 140, an input device 150, a communications unit 160, and/or a flight management system 170 on a data communications bus or systems bus. Generally, the control unit 110 controls the function and operation of the system 100, and particularly manages the recognition, implementation, monitoring, evaluation, modification, and display of timing information, as described in greater detail below. The control unit 110 may be considered to include one or more functional units or modules 112, 114, 116, 118, 120 (e.g., software, hardware, or combinations thereof). As an example, each of the modules 112, 114, 116, 118, 120 may be implemented with a processor 122 and memory 124. In the depicted embodiment, the control unit 110 includes an input module 112, a mode module 114, a rules module 116, a timer module 118, and a display module 120. FIG. 1 depicts one exemplary organization, and other embodiments may perform similar functions with alternative organization or implementation. Additional details about operation of these modules 112, 114, 116, 118, 120 will be provided below.

During general operation, the control unit 110 receives and/or retrieves user inputs (e.g., from input device 150) and various types of system, environmental, and operational data as input data or states (e.g., from the flight management system 170, database 130, and/or communications unit 160); and the control unit 110 evaluates the input states to determine if one or more monitoring modes are triggered. As appropriate for a triggered monitoring mode, the input states are evaluated with respect to associated rules, including rules that involve a timing characteristic as a time period in which the input states should reflect compliance with the rules, such as an occurrence of a further event or non-occurrence of a further event. The control unit 110 maintains or monitors the status of one or more timers based on the timing characteristics as updated input states are received, and based on these timer statuses, the control unit 110 may generate an advisory for the user.

The control unit 110 may also function as a graphics display generator to generate display commands associated with the timer status, timing characteristics and advisories, including visual representations of the timer statuses in digital numerical form, as a clock face, or as a display integrated into an input device. More specific examples are provided below. The display commands are provided to the display device 140 for display to users, which may include the display of the timers in one or more flight deck locations. More specific functions of the system will be discussed below.

As noted above, the control unit 110 (as well as other components of system 100) may be implemented with a computer processor 122, including general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the processor 122 may execute instructions stored in memory 124 to carry out the functions, techniques, and processing tasks or methods associated with operation of the control unit 110. The memory 124 may store computer readable instructions, firmware and software programs and be tangibly embodied on any appropriate medium used for storage of computer readable instructions including, but not limited to, all forms of non-volatile memory, including, by way of example and not by limitation, semiconductor memory devices, such as EPROM, EEPROM, and flash memory devices; magnetic disks such as internal hard disks and removable disks; magneto-optical disks; and DVD disks.

Database 130 is coupled to control unit 110 and may be a memory device (e.g., non-volatile memory, disk, drive, tape, optical storage device, mass storage device, etc.) that stores digital flight information. In particular, the database 130 may store information associated with the creation and implementation of flight plans and other operational tasks. Database 130 can additionally include other types of aircraft and navigation information, such as information used to calculate flight path and determine flight time and departure information. Database 130 may also include, for example, a terrain database, which includes the locations and elevations of natural and manmade terrain. Database 130 may further include other types of databases, such as a weather database, a flight plan database, an obstacle database, a geopolitical database, a terminal airspace database, and/or a special use airspace database. Database 130 may additionally include other types of information, such as from a source of weather data, a terrain avoidance and warning system (TAWS), a traffic and collision avoidance system (TCAS), an instrument landing system (ILS), and a runway awareness and advisory system (RAAS). In some embodiments, the database 130 may include information associated with aircraft limitation and performance attributes. Database 130 may further include aircraft and/or airspace data obtained from the Federal Aviation Administration (FAA), other government or industry groups, and aircraft manufacturers. The data in database 130 may be used to compare input information with various operational and/or flight requirements to subsequently generate dynamic timing information for the aircraft, as discussed below. The data in the database 130 may be uploaded prior to flight or received from external sources, such as an airport transmitter or onboard sensors.

The display device 140 is coupled to the control unit 110 and may include any device or apparatus suitable for displaying timing requirement information or other data associated with aircraft, including various types of computer generated symbols and information representing aircraft operating plans, as well as weather, pitch, heading, flight path, airspeed, altitude, runway information, waypoints, targets, obstacle, and terrain data, in an integrated, multi-color or monochrome form. The display device 140 and/or control unit 110 may include a graphics display generator for generating the appropriate symbology on the screen of the display device 140. In one embodiment, the display device 140 may be an aircraft flight display located within a cockpit or flight deck of the aircraft. In one exemplary embodiment, the control unit 110 may be associated with a primary flight display, a navigation display, vertical display, a multi-function control and display unit, near-to-eye display system, or other type of display for an individual aircraft, a stand-alone device, or a control center (e.g., on the ground as part of a control center for an unmanned aircraft). Any suitable type of display medium capable of visually presenting multi-colored or monochrome information for a user may be provided, such as, for example, various CRT, flat-panel, and other types of display systems (e.g., LCDs, OLED displays, plasma displays, projection displays, HDDs, HUDs, etc.). As described below, a flight deck may be provided with a number of display devices 140 that may be used for displaying timing advisories to the user.

The input device 150 is coupled to the control unit 110 and adapted to allow the user to interact with the system 100. Such an input device 150 may be realized as a lever, keypad, touchpad, keyboard, mouse, touchscreen, joystick, microphone, or another suitable device adapted to receive input from a user. As noted above, one or more display devices 140 may be integrated or otherwise proximate to one or more input devices 150. Examples depicted below include a flap deployment lever and/or an engine start button.

The communications unit 160 may be any suitable device (e.g., a transceiver) for sending and receiving information to and from the control unit 110. In some embodiments, communications unit 160 may be configured to receive radio frequency transmissions, satellite communication transmissions, optical transmissions, laser light transmissions, sonic transmissions or transmissions of any other wireless form of data link. The communications unit 160 may also communicate with other aircraft and/or a control center, such as Air Traffic Control (ATC), to exchange information regarding flight activity in the area.

The flight management system 170 is coupled to the control unit 110 and may provide real-time data regarding operation of the aircraft to the control unit 110, including data representing the input states discussed below. Generally, the flight management system 170 may be considered any source of aircraft data for the system 100, including data from individual aircraft systems, although some types of information may alternatively be stored in, and retrieved from, the database 130. As an example, the flight management system 170 may provide navigation data associated with the current position and flight direction (e.g., heading, course, track, etc.), as well as information about the airspeed, altitude, pitch, flight path, intended destination, takeoff and landing information, and other relevant flight information. The flight management system 170 may also provide information associated with environmental conditions and equipment or system conditions, such as from health or status information systems. The flight management system 170 may include any suitable position and direction determination devices that are capable of providing relevant flight information, including systems and devices such as, for example, an Inertial Reference System (IRS), Air-data Heading Reference System (AHRS), and/or a global positioning system (GPS), as well as various types of altitude sensors, attitude sensors, terrain sensors, and other types of ranging sensors.

As introduced above, the system 100 functions to collect, evaluate, and present information associated with one or more timing characteristics for the aircraft. In one exemplary embodiment, the system 100 particularly functions to display one or more timers to the user on the flight deck, as discussed in greater detail below.

Figure 2:
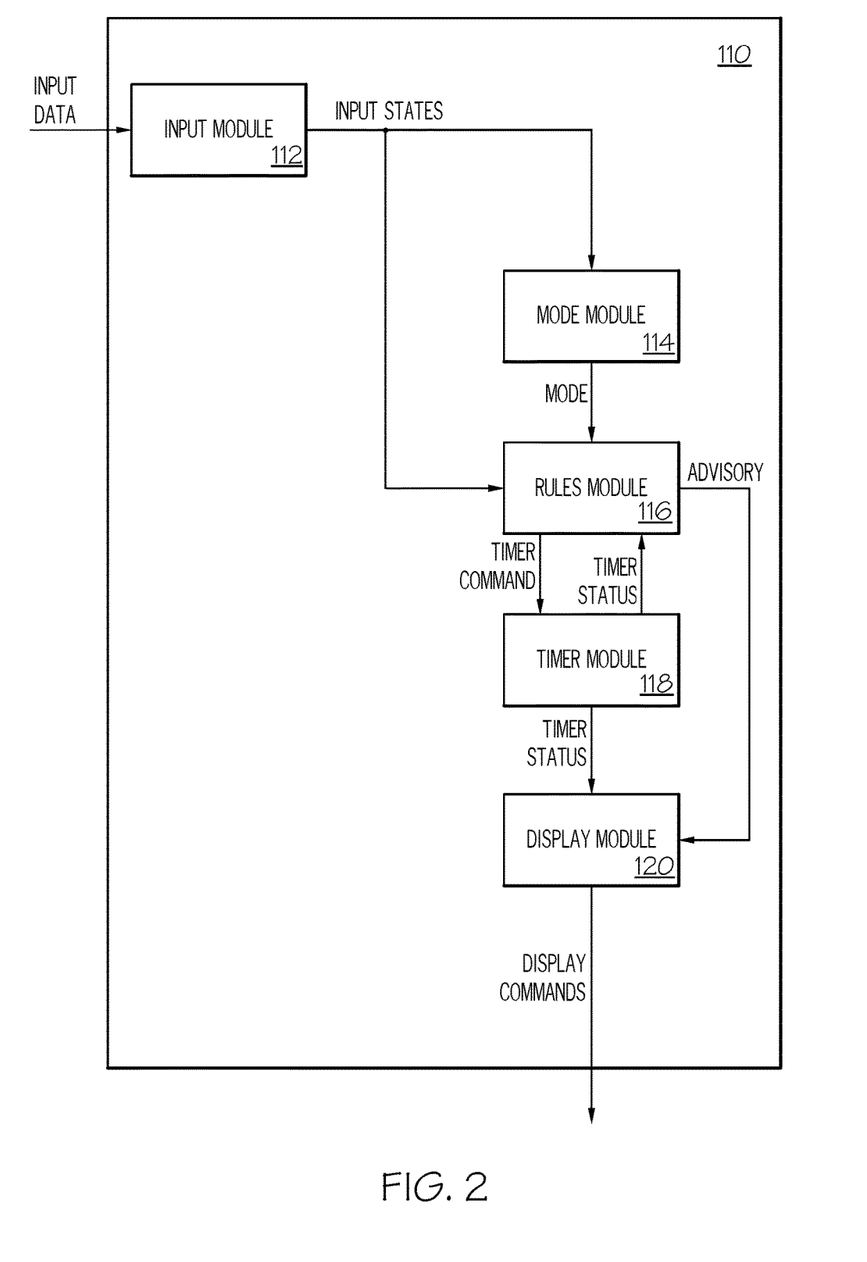
FIG. 2 is a block diagram of a control unit of the timer management system of FIG. 1 in accordance with an exemplary embodiment.

FIG. 2 is a block diagram of the control unit 110 of the timer management system 100 of FIG. 1 in accordance with an exemplary embodiment. FIG. 2 also depicts exemplary data flows associated with the modules 112, 114, 116, 118, 120 of the control unit 110 to facilitate a description of the operation.

The input module 112 may collect or otherwise receive operational, environmental, flight, and/or navigation information associated with the ownship aircraft as input data. In one embodiment, the input module 112 receives the input data directly from an aircraft system. For example, the input module 112 may receive information regarding the location, speed, direction, altitude, and the like for the aircraft from the flight management system 170. The input module 112 may also receive other types of relevant information, such as system or component health or status data from various sources, including the flight management system 170, database 130, other systems of the aircraft, data from other aircraft, and/or data from a control center.

The input module 112 generally functions to receive, filter, and/or parse data from the various sources to identify the data representing the input states for the system 100. As noted above, the input states are provided to the mode module 114 and/or the rules module 116.

Generally, the mode module 114 functions to evaluate the input states and determine if any one or more of the input states trigger one or more monitoring modes. As noted above, a monitoring mode may be considered an operational condition in which rules define requirements for the occurrence or non-occurrence of an event or combination of events within one or more timing constraints. As such, the mode module 114 may evaluate the input states and determine if the conditions associated with the monitoring mode are satisfied, thus triggering the monitoring mode. The modes may be considered conditions, algorithms, or models stored in the database 130, and may be provided to the rules module 116.

The rules module 116 functions to identify, retrieve, and evaluate compliance with one or more rules associated with a respective mode. Such rules may be embodied as required conditions, algorithms or models stored in the database 130. As such, the rules module 116 receives the mode from the mode module 114 and the input states from the input module 112. In response, the rules module 112 determines the relevant rules associated with the mode and determines if the input states comply with the relevant rules.

As noted above, the rules evaluated by the rules module 116 may have a timing component or characteristic representing a time period for compliance for the rule. The timer module 118 functions to maintain the timers based on commands from the rules module 116. As such, upon initiation of monitoring the input states with respect to a rule, the rules module 116 may initiate a timer according to the timing characteristic, and upon receipt of further input states and/or mode information, the rules module 116 may modify the timer or remove the timer based on the relevant rule and input states.

The timer module 118 may generate a timer status representing the current, real-time value or other aspect of the timer, such as the elapsed time, remaining time, and/or other timing characteristics. The timer module 118 provides the timing status to the display module 120, rules module 116, and/or mode module 114.

In some embodiments, the timing status may function as an input state for the rules module 116 and/or the mode module 114. The timing status may trigger a new mode in the mode module 114 and/or may further inform the evaluation of the rules module 116. As an example, the rules module 116 may generate an advisory based on the timing status and the relevant rules. For example, each rule may define an advisory value relative to the timing characteristic at which an advisory should be generated. The advisory value may be a time value shortly before expiration of the time period of the timing characteristic (e.g., 1 minute, 5 seconds, etc.), Further examples will be discussed in greater detail below.

The display module 120 generally receives the advisory from the rules module 116. In response, the display module 120 generates display commands representing the advisory and provides the display commands to the display device 140 for presentation to the user on the display device 140. In the event that the system 100 is associated with multiple display devices 140, the display module 120 sends the display command to the most appropriate display device 140, e.g., which may be defined by the relevant rules.

An example of an advisory may be in the form of a timing status. In particular, the advisory may include a countdown in minutes or seconds, as appropriate, in which the input states should comply with one or more of the rules. The countdown of the timer may be displayed with text or symbology indicating the nature or context of the advisory. Further, the symbology may be integrated with the a particular display or control associated with the timer. For example, as engine speed rises above maximum takeoff power, the timer for max takeoff power may be represented by as a timer countdown near the N1 gauge or as a tape display representing time, thereby indicating that the engine should be brought out of takeoff power at or prior to timer expiration. More detailed examples are provided below.

The advisory may function as a warning when the timing status requires a more urgent response or attention, e.g., when the time period in which to comply with the rule is shorter or has elapsed. In some embodiments, color, size, shape, and/or dynamic nature (e.g., blinking) of the symbology may be used to represent the urgency of the warning.

In effect, the advisories may be selectively displayed in accordance with the relevant rules. Initially, the advisories may not be displayed at all, while at certain timing statuses, the advisories will be visible, and then at further timing statuses, the advisories become warnings. This enables the pilot to be appropriately notified of the approaching time constraint. As noted above, the advisories may be displayed based on an advisory value associated with the respective rule.

In one embodiment, the display module 120 may display the advisories individually for display on the most appropriate display device 140. In some embodiments, the display module 120 may aggregate one or more (or all) of the timing statuses currently monitored by the system 100 to provide an overall timing situation. The timing situation may take the form of a list or collection of timing statuses organized in any suitable manner, such as by urgency, class, or aircraft system. As a further example, the timing situation may be represented by a single timeline in which the timing statuses are arranged by time remaining.

In this manner, the timers may be automatically set and advisories automatically generated without user interaction based on predetermined modes and rules for the current input states. As such, the advisories inform the user of the requirement, the timing characteristic associated with the requirement, and the current timer status for compliance with the requirement.

The system 100 may be associated with any suitable aircraft or flight function or monitored characteristic. A number of examples are provided below.

In one embodiment, a class of one or more of the monitored characteristics may be based on engine limitations. One such example corresponds to the limitations on takeoff power. In this example, the input module 112 determines the input states associated with the throttle position. When the mode module 114 identifies that the throttle position represents maximum takeoff power, the mode module 114 initiates a monitoring mode associated with the maximum takeoff power. Upon initiation of the monitoring mode, the rules module 116 evaluates the associated rules, including a rule that requires maximum takeoff power to be limited to five minutes. As such, the rules module 116 initiates a timer set for five minutes in the timer module 118 and continues to monitor the updated input states associated with the monitoring mode.

The timer module 118 provides timing statuses to the rules module 116, and when the timing status reaches the advisory value, the rules module 116 may initiate an advisory for the user, which may be represented by display commands generated by the display module 120. The advisory may be in the form of a display of the timing status. In particular, the displayed timing status may be a real-time countdown of the time remaining for compliance with the rule. The predetermined timing status that results in the advisory may be, for example, when the timing status reaches one minute, or the advisory may be displayed at all timing statuses. In some instances, the rules module 116 may generate the advisory as a warning based on the timing status. For example, when the timing status reaches 10 seconds, the displayed timing status may change color or size to indicate urgency.

Further, in this example, when the updated input states indicate that the throttle position is no longer at maximum power, the rules module 116 recognizes compliance with the rule, provides compliance information to the mode module 114 such that the mode module 114 declares an end to the monitoring mode, and removes the timer from the timer module 118. The initiation of the monitoring mode, evaluation of the relevant rules and timing statuses, and subsequent removal of the advisory and associated termination of the monitoring mode upon compliance may be implemented automatically, e.g., without user intervention.

As the rules module 116 receives updated input states, some types of input states may result in a modification of the timing characteristic such that the rules module 116 initiates modification of the timer maintained by the timer module 120. In one embodiment, each mode may have multiple rules with different timing characteristics, one or more of which may be selected based on input states. If a change in input state requires a change in rule and timing characteristic, the timer may be modified, e.g., by adding or subtracting time. For example, in the maximum takeoff power situation discussed above, if the input states indicate that an engine is no longer operational, the rules module 116 may add five minutes to the current timing status of the still-operating timer to reflect a rule and/or timing characteristic associated with aircraft single engine operation. As such, the time remaining on the timer will be increased by five minutes from the current time remaining.

In a further embodiment, a class of one or more of the monitored characteristics may be associated with normal system operation. One such example corresponds to the requirements for anti-ice procedures. In this example, the input module 112 receives input states associated with the environmental conditions, such as temperature and/or humidity or visible moisture values, observed by the aircraft sensors or even referenced in a weather report on-field received by the communications unit 160. When the mode module 114 identifies that conditions require a ground warm-up to prevent or mitigate ice formation, the mode module 114 initiates a monitoring mode associated with the anti-ice warm-up procedures. Upon initiation of this monitoring mode, the rules module 116 evaluates the associated rules, including a rule that requires engine power above a predetermined level (e.g., above 65%) for one minute out of every four minute interval.

As such, if the input states indicate that the engine is above the predetermined level, the rules module 116 initiates a timer set for one minute in the timer module 120 and continues to monitor the updated input states associated with the monitoring mode. When the input states indicate that the engine has been above the predetermined level for one minute, and is no longer above the predetermined level, the rules module 116 may modify the timer by setting the timer to three minutes in the timer module 120. In other words, the rules module 116 sets the timer based on the current input states, and when the input states indicates a change in engine state, the rules module 116 changes the timer according to the rule or rules of the monitoring mode. Regardless of the engine state, the rules module 116 may initiate a display of the current timer status with context symbology for the user via the display module 120 on the display device 140 in accordance with the rule or rules. As such, the user may be continuously informed of the timing status representing the time characteristic in the relevant rule, thereby providing the user information on whether the engine should be above 65% power or below 65% power. For example, the timing context may indicate "TIME REMAINING FOR 65% POWER" or "TIME REMAINING FOR POWER OFF/UNTIL 65% POWER" or "REDUCE POWER IN [N] SECONDS [or ENGINE ANTI-ICE TIMER COMPLETE]".

Moreover, when the input states indicate that the environmental conditions have changed such that warm-up anti-ice procedures are no longer necessary, the mode module 114 may discontinue the monitoring mode and any timers being displayed.

A further example corresponds to the requirements for aircraft flap procedures. In this example, the input module 112 receives input states associated with the flaps, as well as environmental conditions, as appropriate.

When the mode module 114 identifies that the flaps have been deployed, the mode module 114 initiates a monitoring mode based on the flap cycle requirements. Upon initiation of the monitoring mode, the rules module 116 evaluates the associated rules. Such rules may include, as examples, a limit of eight deployments per hour in a low outside temperature range, or a limit of four deployments per hour in a high temperature range. In other words, the rules module 116 may select conditional rules or rules based on the input states. The rules may also define the flap position or actuation state that qualifies as a deployment, for instance, from zero to 15 degrees and back, or zero to 15 to 30 degrees and back.

As such, the rules module 116 may initiate a timer (e.g., an hour) in the timer module 118 and monitor the timer status and the updated input states as the number of deployments. When the input states indicate that the number of deployments is approaching the limit, the rules module 116 may initiate a display of the advisory representing the current timer status with context symbology for the user via the display module 120 on the display device 140. Such context symbology may include the number of deployments and/or the number of deployments remaining for compliance with the limit.

A further example may include the requirements for battery and/or starter procedures. In this example, the input module 112 receives input states associated with starter and/or battery conditions, such as input states representing implementation of a start. When the mode module 114 identifies that a start has been implemented, the mode module 114 initiates a monitoring mode associated with the starter and/or battery procedures. Upon initiation of the monitoring mode, the rules module 116 evaluates the associated rules, including a rule that the starter may be limited to three starts in 30 minutes, with a 60 second rest period. Other rules evaluated by the rules module 116 in this monitoring mode may include a rule that the battery is limited to three starts per hour. The rules may also define conditions that qualify as partial or full start equivalents, such as a rule that states a connected ground power unit is considered one-third of a battery start. As such, the rules module 116 monitors the updated input states representing the number of starts in view of the applicable rule and timing characteristics (e.g., the overall 30 minute period, each 60 second period between starts, etc.). In effect, the input states may trigger a number of modes and monitoring requirements. As such, the rules module 116 may also evaluate the applicable rules to determine which rule is limiting (e.g., between the starter rules and the battery rules) and generate an advisory accordingly. In effect, the rules and associated timing characteristics may not be merely a single timer, but a number of interdependent limitations in which one may be controlling to the limit, and then the delay period thereafter. The rules module 116 may generate an advisory via the display module 120 on the display device 140 based on the limiting rule, which may include the applicable timer and associated context.

A further example may include the requirements associated with landings and braking procedures. In this example, the input module 112 identifies input states associated with landing and/or braking conditions, such as input states representing a landing with hard braking, e.g., based on deceleration values, flap positions, etc. When the mode module 114 identifies that such conditions warrant, the mode module 114 initiates a monitoring mode associated with the landing and/or braking procedures. Upon initiation of the monitoring mode, the rules module 116 evaluates the associated rules, including a rule that requires 45 minutes between such landings. As an example, the rules module 116 may initiate a timer of 45 minutes after the first hard braking and monitors the updated input states for conditions that may result in non-compliance, such as preparing for a procedure in which a hard braking may potentially be utilized. The rules module 116 may generate an advisory with the timing status via the display module 120 for display on the display device 140. In some embodiments, the rules evaluated by the rules module 116 may also implicate other timing characteristics or conditions, such as modifying a timer tracking a planned takeoff time.

In a further embodiment, the input module 112 may identify input states associated with fuel balancing, particularly when the aircraft is undergoing a fuel balancing procedure. In cases where an aircraft has a left tank and a right tank (or forward and aft), and one tank has more fuel than the other, manual fuel balancing may be used to transfer fuel from one side to the other. In this situation, the rules evaluated by the rules module 116 may identify the timing characteristics from other systems, such as the predicted time remaining until the fuel is balanced from the fuel gauges or flight management system 170 (or other system that is performing or providing input to the balancing operation). The rules module 116 may set a timer that matches the predicted time remaining, and generate an advisory with the timer status for display on the display device. 140.

The rules module 116 continues to monitor the input states representing the predicted time remaining and modify the timer in the timer module accordingly based on the rule or rules implicated by the input states. Generally, the monitoring frequency may be increased as the predicted time remaining decreases. The result of increasing monitoring frequency further emphasizes the context and urgency of the timer and advisory. For example, the advisory associated with the timer may be emphasized at 20 minutes, 10 minutes, 5 minutes, 3 minutes, 2 minutes, 1 minute, 30 seconds, 10 seconds, 5 seconds, 3 seconds, 2 seconds, and 1 second, and this tempo increase may facilitate awareness and direct user attention.

In some embodiments, the timer statuses of the timers may be used as input states that trigger other monitoring modes with different rules and timing characteristics. In effect, one timer may feed other timers associated with other modes or rules. As an example, if a start limit is exceeded, and the associated rules require a delay of 30 minutes before the next start, the flight plan taxi and takeoff times may both be updated based on the start limit timer.

As noted above, the system 100, particularly the control unit 110, functions to generate and display timing advisories that may be implemented on any suitable type of aircraft display, such as display device 140. Examples of the timing advisories are provided in FIGS. 3-9.

Figure 3:
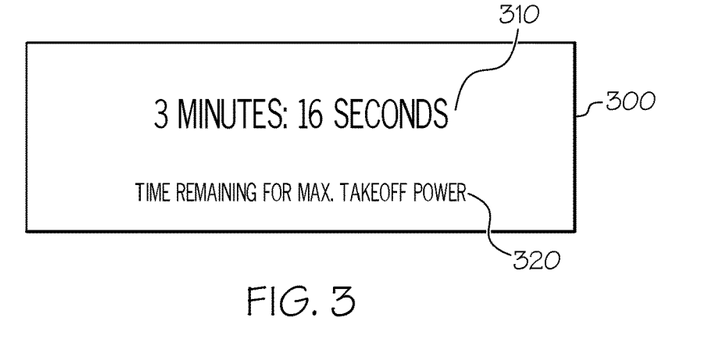
FIGS. 3-9 are visual advisories generated by the timer management system of FIG. 1 in accordance with an exemplary embodiment.
Figure 4:
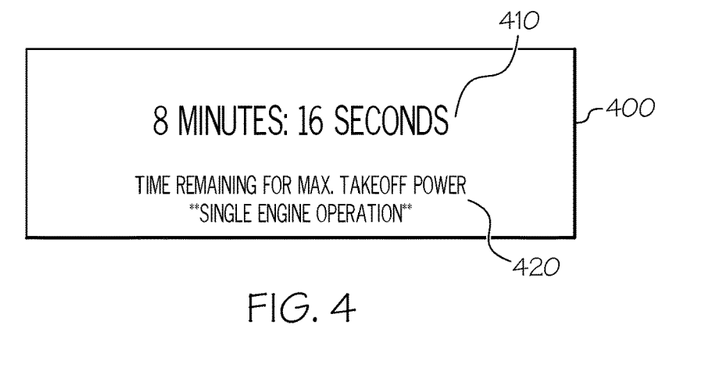
Figure 5:
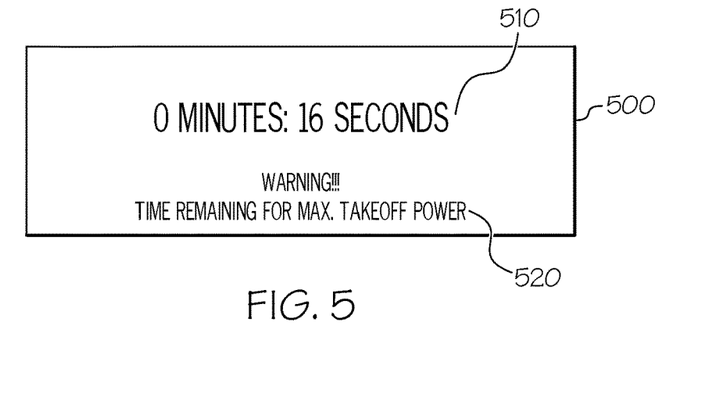

As a first example, FIG. 3 depicts symbology representing an advisory 300, which in this example, corresponds to the maximum takeoff power situation discussed above. As shown, the advisory 300 includes a timer status 310 counting down the time remaining and text representing context information 320. As a further example, FIG. 4 depicts a similar advisory 400, except that the timer status 410 has been modified to reflect a changing condition, which is described in the context information 420. As another example, FIG. 5 depicts a similar advisory 500, except that the timer status 510 has decreased such that a warning is generated, as reflected in the context information 520.

Figure 6:
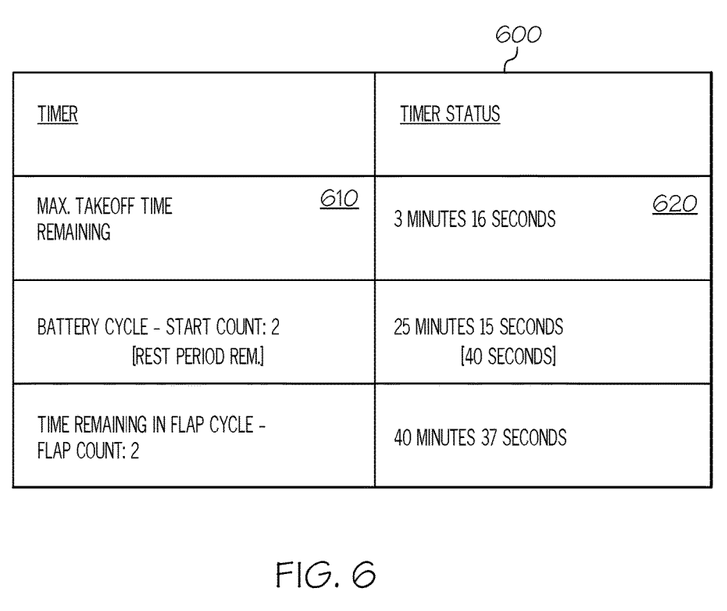

FIG. 6 is an example of multiple advisories 600 in the form of a timeline or list that includes, for each advisory, a timer context 610 and an associated timer status 620. Although various examples of symbology are presented in FIGS. 3-6, any suitable type or manner of symbology may be used.

While FIGS. 3-6 present more general types and examples of advisories and/or timer information, the advisories may also be presented in a manner that is more integrated with the underlying context. Further examples are provided in FIGS. 7-9.

Figure 7:
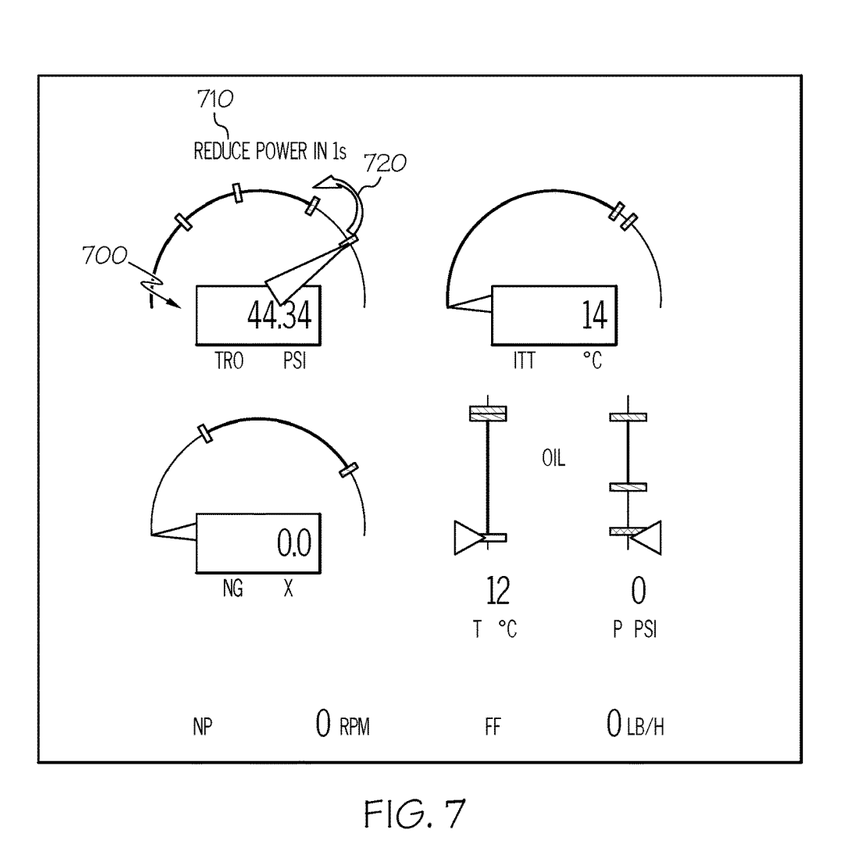

FIG. 7 is a further example of symbology representing an advisory 700 associated with the maximum takeoff power situation discussed above. In this example, the advisory 700 is integrated into the gauge or dial that typically depicts a parameter associated with primary power (e.g., engine speed, engine torque, or the like, depending on the aircraft). As shown, the advisory 700 includes a text message 710 detailing the context and nature of the advisory 700, which in this instance states "Reduce power in 1 sec", thereby indicating that the timer for maximum takeoff power has almost expired. The advisory 700 further includes arrow symbology 720 that indicate the desired or suggested movement of the command caret along the gauge corresponding to the required decrease in power within the timer period.

Figure 8:
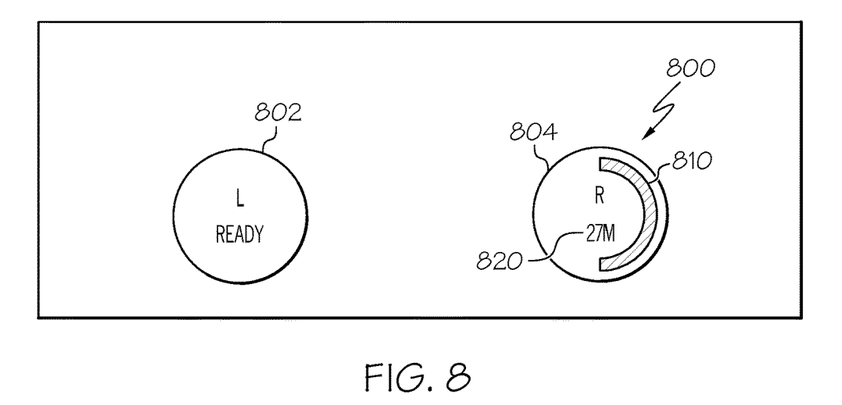

FIG. 8 is a further example of symbology representing an advisory 800 associated with the engine start situation discussed above. In this example, the advisory 800 is integrated into the engine start buttons 802, 804 that the user actuates to start the left engine (e.g., button 802) and the right engine (e.g., button 804). As noted above, the rules related to engine starts may include a predetermined number of starts (e.g., three starts) within a time period (e.g., within a 30 minute time period). In the example depicted in FIG. 8, the user has already started the right engine three times within the first three minutes of the 30 minute time period. As such, the user should not attempt to start the right engine for 27 minutes. In this situation, the control unit 110 generates the advisory 800 for display on the display device 140 (FIG. 1). As such, the advisory 800 in FIG. 8 is associated with the right engine button 804 and includes a decreasing timer bar 810 that extends around a portion of the circumference of the button 804 and a text message 820 stating the remaining value of the timer. In this manner, the user is informed that the right engine should not be started for another 27 minutes.

Figure 9:
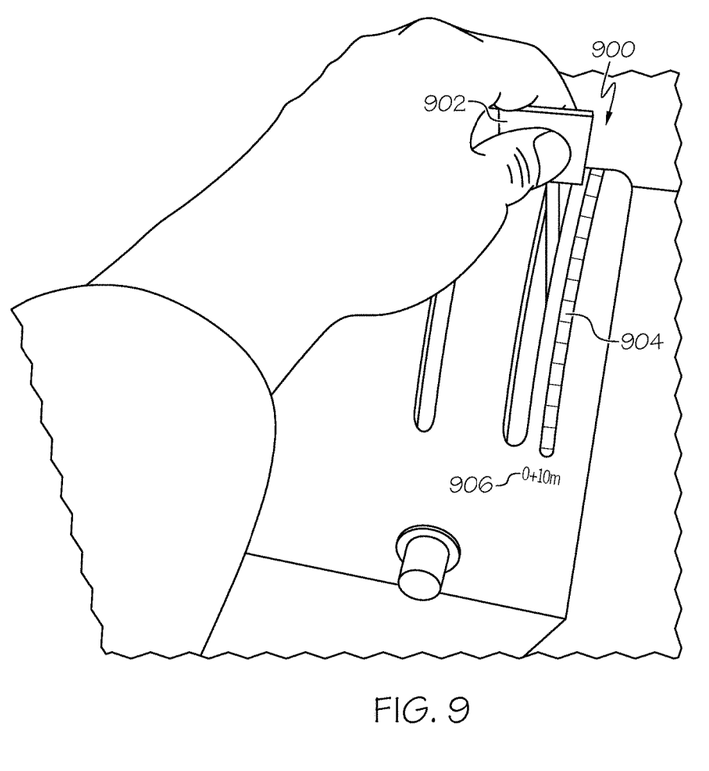

FIG. 9 is a further example of symbology representing an advisory 900 associated with the aircraft flap situation discussed above. In this example, the advisory 900 is integrated into the flap controls 902 that the user actuates to adjust the flaps. As noted above, the rules related to engine starts may include a predetermined number of flap deployments (e.g., four or eight deployments, depending on temperature) within a time period (e.g., within a 60 minute time period). In the example depicted in FIG. 9, the user has already deployed the flaps up to the limit and 10 minutes remain within the time period. As such, the user should not attempt to deploy the flaps for another 10 minutes. In this situation, the control unit 110 generates the advisory 900 for display on the display device 140 (FIG. 1). In this example, the display device 140 may be represented by a strip of display 904 (e.g., as an LED screen or row of lights) and a text display 906 adjacent to the flap controls 902. As such, in this example, the advisory 900 in FIG. 9 a decreasing timer bar 910 in display 904 and a text message 920 stating the remaining value of the timer adjacent to the flap controls 902.

Accordingly, exemplary embodiments enable timer management on a flight deck for numerous types of flight and operational requirements in a manner that is intuitive and graphically integrated with other types of flight information. In general, such symbology facilitates flight crew or operator situational awareness and vehicle control, which reduces pilot or operator workload and navigation errors, and thus results in increased aircraft and/or navigation safety.

For the sake of brevity, conventional techniques related to graphics and image processing, navigation, flight planning, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight deck timer management system, comprising:
   a database storing conditions representing a first monitoring mode defining at least a first rule, a first timing characteristic defining a first time period for compliance with the first rule, and a first advisory value relative to the first time period at which a first advisory is initiated;
   a control unit coupled to the database and configured to receive input data, to identify input states based on the input data, and to evaluate the input states in view of the first monitoring mode conditions,
   wherein, when the input states trigger the first monitoring mode, the control unit is configured to
      evaluate the input states in view of the first rule,
      initiate a first timer based on the first timing characteristic,
      monitor a first timing status of the first timer relative to the first advisory value, and
      generate display commands representing the first advisory when the first timer status reaches the first advisory value; and
   a display device coupled to the control unit and configured to display the first advisory based on the display commands,
   wherein the database stores a second rule associated with the first monitoring mode with a second timing characteristic defining a second time period for compliance with the second rule, and a second advisory value relative to the second time period at which a second advisory is initiated, and
   wherein the control unit is configured to select the first rule or the second rule based on the input states,
   wherein, upon selection of the second rule, the control unit is configured to
      evaluate the input states in view of the second rule,
      initiate a second timer based on the second timing characteristic,
      monitor a second timing status of the second timer relative to the second advisory value, and
      generate display commands representing the second advisory when the second timer status reaches the second advisory value; and
   wherein the display device is configured to display the second advisory based on the display commands.

2. The flight deck timer management system of claim 1, wherein the display device is configured to display a representation of the first timer status of the first timer as part of the first advisory.

3. The flight deck timer management system of claim 1, wherein the display device is configured to display a countdown of the first timer status as part of the first advisory.

4. The flight deck timer management system of claim 1, wherein the display device is configured to display a text message associated with the first rule as part of the first advisory.

5. The flight deck timer management system of claim 1, wherein the control unit is configured to receive updated input data, to identify updated input states based on the updated input data, and to evaluate the updated input states in view of the first rule and the first time period, and
   wherein, upon determining that the updated input states indicate compliance with the first rule, the control unit is configured to cease the first monitoring mode and the first timer.

6. A flight deck timer management system, comprising:
   a database storing conditions representing a first monitoring mode defining at least a first rule, a first timing characteristic defining a first time period for compliance with the first rule, and a first advisory value relative to the first time period at which a first advisory is initiated;

a control unit coupled to the database and configured to receive input data, to identify input states based on the input data, and to evaluate the input states in view of the first monitoring mode conditions, wherein, when the input states trigger the first monitoring mode, the control unit is configured to evaluate the input states in view of the first rule, initiate a first timer based on the first timing characteristic, monitor a first timing status of the first timer relative to the first advisory value, and generate display commands representing the first advisory when the first timer status reaches the first advisory value; and a display device coupled to the control unit and configured to display the first advisory based on the display commands, wherein the control unit is configured to receive updated input data, to identify updated input states based on the updated input data, and to evaluate the updated input states in view of the first rule and the first time period, and wherein the control unit is configured to modify the first timer based on the updated input states and the first rule.

7. The flight deck timer management system of claim 6, wherein the database stores a second rule associated with the first monitoring mode with a second timing characteristic defining a second time period for compliance with the second rule, and a second advisory value relative to the second time period at which a second advisory is initiated, and wherein the control unit is configured to select the first rule or the second rule based on the input states, wherein, upon selection of the second rule, the control unit is configured to evaluate the input states in view of the second rule, initiate a second timer based on the second timing characteristic, monitor a second timing status of the second timer relative to the second advisory value, and generate display commands representing the second advisory when the second timer status reaches the second advisory value; and wherein the display device is configured to display the second advisory based on the display commands.

8. The flight deck timer management system of claim 1, wherein the first rule is associated with engine limitations.

9. The flight deck timer management system of claim 8, wherein the first rule is associated with maximum takeoff power limitations.

10. The flight deck timer management system of claim 9, wherein the display device is integrated into an engine gauge.

11. The flight deck timer management system of claim 1, wherein the first rule is associated with flap deployment limitations.

12. The flight deck timer management system of claim 11, wherein the display device is integrated into a flap deployment lever.

13. The flight deck timer management system of claim 1, wherein the first rule is associated with engine start limitations.

14. The flight deck timer management system of claim 13, wherein the display device is integrated into an engine starter button.

15. A method of managing timers on a flight deck, comprising:

storing, with a database, conditions representing a first monitoring mode defining at least a first rule, a first timing characteristic defining a first time period for compliance with the first rule, and a first advisory value relative to the first time period at which a first advisory is initiated;

receiving, with a control unit, input data;

identifying, with the control unit, input states based on the input data;

evaluating, with the control unit, the input states in view of the first monitoring mode conditions;

evaluating, with the control unit when the input states trigger the first monitoring mode, the input states in view of the first rule, initiating a first timer based on the first timing characteristic, monitoring a first timing status of the first timer relative to the first advisory value, and generating display commands representing the first advisory when the first timer status reaches the first advisory value;

displaying, with a display device, the first advisory based on the display commands;

receiving, with the control unit, updated input data;

identifying, with the control unit, updated input states based on the updated input data;

evaluating, with the control unit, the updated input states in view of the first rule and the first time period; and ceasing, with the control unit upon determining that the updated input states indicate compliance with the first rule, the first monitoring mode and the first timer.

16. The method of claim 15, wherein the displaying step includes displaying a representation of the first timer status of the first timer as part of the first advisory.

17. The method of claim 15, wherein the displaying step includes displaying a countdown of the first timer status as part of the first advisory.

18. The method of claim 15, wherein the displaying step includes displaying a text message associated with the first rule as part of the first advisory.

19. The method of claim 15, further comprising storing, with the database, a second rule associated with the first monitoring mode with a second timing characteristic defining a second time period for compliance with the second rule, and a second advisory value relative to the second time period at which a second advisory is initiated;

selecting, with the control unit, the first rule or the second rule based on the input states; and evaluating, with the control unit upon selection of the second rule, the input states in view of the second rule, initiating a second timer based on the second timing characteristic, monitoring a second timing status of the second timer relative to the second advisory value, and generating display commands representing the second advisory when the second timer status reaches the second advisory value.

* * * * *